Patented July 12, 1927.

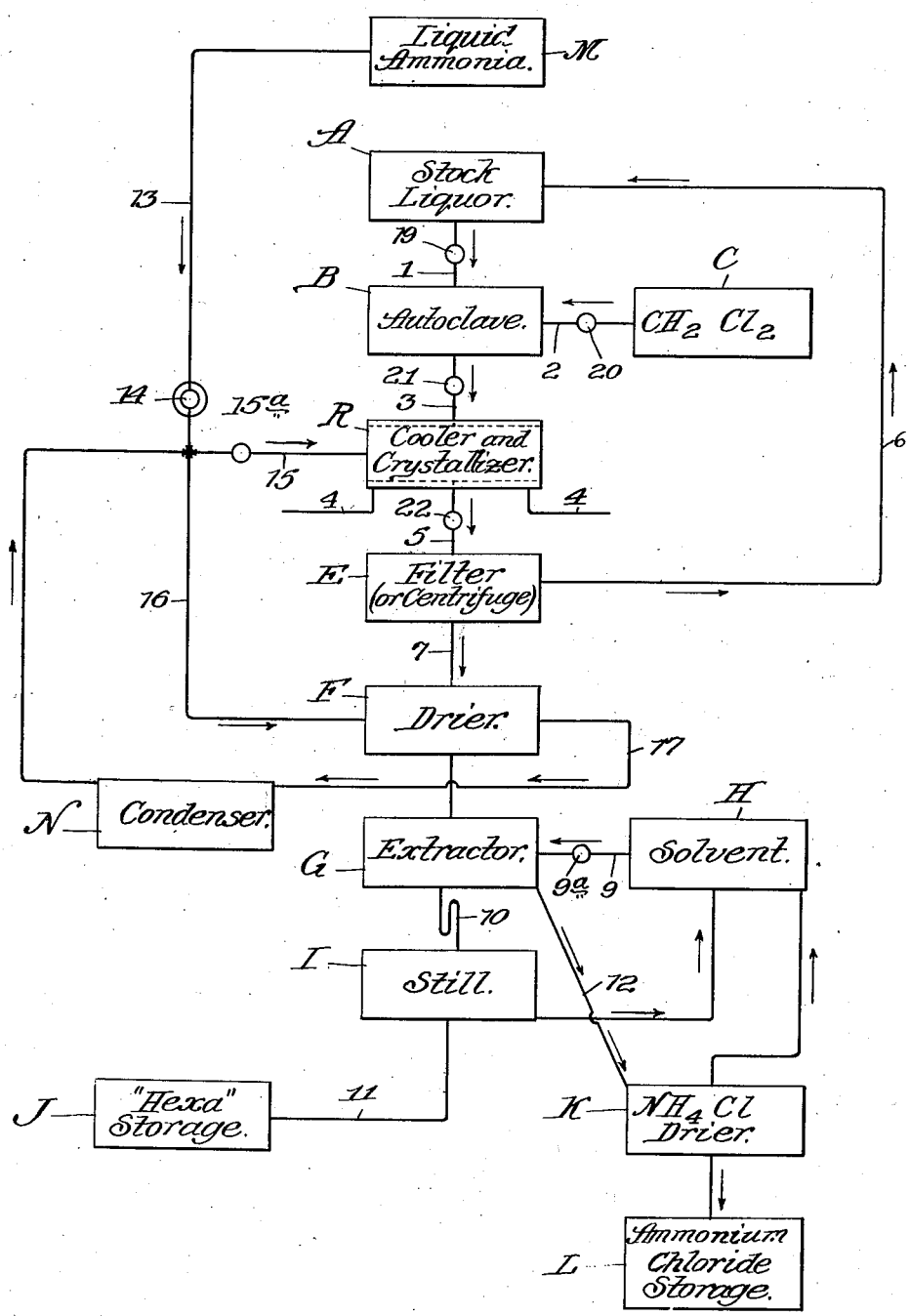

1,635,707

UNITED STATES PATENT OFFICE.

CARNIE B. CARTER, OF PITTSBURGH, PENNSYLVANIA, ASSIGNOR TO S. KARPEN & BROS., OF CHICAGO, ILLINOIS, A CORPORATION OF WEST VIRGINIA.

MANUFACTURE OF HEXAMETHYLENETETRAMINE.

Application filed February 9, 1924. Serial No. 691,673.

The present invention relates to an improved process which enables hexamethylenetetramine to be produced easily, quickly, and at reduced cost. Hexamethylenetetramine can be produced by reacting on methylene chloride with ammonia under suitable conditions, in accordance with the theoretical proportions, as set forth in the following equation:

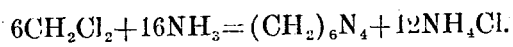

It has been known for many years that ammonia in solution in alcohol reacts with methylene chloride: Holand ([1]), as far back as 1887, testing for carbon affinities, heated theoretical proportions of methylene chloride and ammonia in alcohol solution. He did not complete the reaction, however, and he did not succeed in isolating hexamethylenetetramine, although he stated, in effect, that he obtained a sublimate which possessed the properties of hexamethylene-amine. It can now be demonstrated that the presence of water, in the Holand experiment, results in a phenomenon of hydrolysis leading to the production of hexamethylenetetramine hydrochloride.

Later, Delepine ([2]), in 1894, produced hexamethylenetetramine hydrochloride by heating a solution of methylene chloride and ammonia in methyl alcohol. He employed proportions giving rise directly to the production of the hydrochloride, which product he identified by two tests. The equation given by him is as follows:

Neither of the experiments mentioned above resulted in the isolation of hexamethylenetetramine, and so far as I am aware, no method for producing hexamethylenetetramine from methylene chloride and ammonia resulted prior to the discovery, or invention, set forth in the joint application of C. B. Carter and A. E. Coxe, Serial Number 583,915, filed August 23, 1922. That invention was based on the discovery that liquid ammonia would serve as a solvent for methylene chloride and would react directly therewith to produce hexamethylenetetramine and ammonium chloride, and that the hexamethylenetetramine could be separated from the ammonium chloride in a very simple manner and be thus obtained directly in a high state of purity. In my application Number 685,456, filed January 10, 1924, is set forth an improvement on our joint invention mentioned, said improvement being based upon the discovery that a very large excess of ammonia, preferably an excess of 300% or more above the theoretical proportion, would very greatly increase the reaction velocity and enable the reaction to be carried out at greatly reduced pressure, using a moderate period of heating. In both these liquid ammonia processes, the phenomenon of hydrolysis does not appear or present any obstacle, because water is not present, or, if present, is only present in very small percentage. Moreover, in those processes, ammonia is present in the liquid form to a certain extent in the products of the reaction and will thus operate to prevent hydrolysis if a small proportion of water be present.

The present invention is based upon four discoveries, viz:

1. That the presence of water in a reaction mixture of methylene chloride and ammonia greatly increases the reaction velocity.

2. That the phenomenon of hydrolysis, with consequent production of hexamethylenetetramine hydrochloride, may be obviated by maintaining an excess of ammonia while water is present in the reaction mixture or in the resultant mixture of compounds so that it will be impossible for hydrochloric acid to form as a result of the reduction of ammonia below the theoretical proportion at any time, or in any portion of the mixture.

3. That the use of a large excess of ammonia in aqueous solution greatly expedites the reaction and enables the process to be carried out at lower pressures and in less time than is possible by the use of the liquid ammonia process employing a large excess of ammonia.

4. That alcohol is not required as a solvent for the methylene chloride, since ammonia in aqueous solution serves this function; and that alcohol acts to retard the reaction, and, if used in very high percentage, will so decrease the reaction velocity as to render the

[1] Liebigs Annalen, 240, 225 (1887).
[2] Bull. Soc. Chim., (3) 11, 556 (1894).

process very expensive, if not actually non-commercial.

The following experiment illustrates the retarding action of alcohol and the effect of the phenomenon of hydrolysis as the result of water present in commercial alcohol used as a solvent:

A glass test tube having a capacity of 25 to 30 cc. was prepared for the experiment. This tube which was hermetically sealed contained 2.56 grams of methylene chloride and 23 cc. of (commercial) alcoholic ammonia solution. Analysis of the alcoholic ammonia solution, prepared by dissolving dry ammonia gas in 95% alcohol, showed that the tube carried (some excess) 1.60 grams of ammonia as against a theoretical requirement of 1.37 grams. The tube was heated in boiling water for a period of 72 hours after which the contents were transferred to a small flask and the alcohol distilled off on the water bath. The residue from the evaporation was extracted with pure dry chloroform to remove all hexamethylenetetramine and leave the ammonium chloride. Hexamethylenetetramine was recovered from the chloroform and weighed. The ammonium chloride was determined by analysis.

Hexamethylenetetramine recovered, 0.189 gram, equivalent to 0.69 gram of methylene chloride. Chloride found, calculated as methylene chloride 1.16 grams.

$$\text{Hexamethylenetetramine yield} = \frac{0.69}{1.16} \times 100 = 59.5\%$$

$$\text{State of the reaction} = \frac{1.16}{2.56} \times 100 = 45.3\% \text{ complete.}$$

The results show two facts very clearly. In the first place they show that the reaction is only 45.3% complete after 72 hours of heating at 100° C., in the second place, they show that only 59.5% of the theoretical yield of hexamethylenetetramine is obtained. The chloride present in the reaction product shows that 1.16 grams of methylene chloride has reacted; accordingly there should be produced 0.318 grams of hexamethylenetetramine, whereas only 0.189 gram is actually recovered. The poor hexamethylenetetramine yield is due to water in the alcohol. The effectiveness of water in diminishing the hexamethylenetetramine yield is still more strikingly shown by the following experiment:

A similar test employing a solvent consisting of 85% alcohol and 15% water with a slightly decreased percentage of ammonia, which, however, was still slightly above the theoretical percentage showed, after 72 hours heating at 100° C., a reaction 64.1% complete and a yield of 22.4% of the theoretical yield at this stage.

In the experiments just mentioned, doubtless, hexamethylenetetramine was actually produced in theoretical quantity and was contained in solution as such in the liquor. In the evaporation process, however, a slight excess of ammonia escaped and this was followed by escape of ammonia involved in the phenomenon of hydrolysis, so that hydrochloric acid remained in the liquor, thus forming the hydrochloride. The phenomenon of hydrolysis will be understood by consideration of the following equations which may be considered as representing reactions which take place in the reacting mixture when ammonia is not present in large enough proportion to prevent an unbalancing effect as the result of the escape of ammonia:

$6CH_2Cl_2 + 16NH_3 = (CH_2)_6N_4 + 12NH_4Cl$
$NH_4Cl + H_2O \rightleftharpoons NH_4OH + HCl$
$NH_4OH \rightleftharpoons NH_3 + H_2O$
$(CH_2)_6N_4 + HCl \rightleftharpoons (CH_2)_6N_4 \cdot HCl$
$(CH_2)_6N_4 \cdot HCl + 6H_2O \rightarrow$
$\quad \leftarrow 6CH_2O + 4NH_3 + HCl.$ The following experiments illustrate the loss from hydrolysis, and the method of overcoming the loss:

Two mixtures were prepared, each containing 0.3 gram of pure hexamethylenetetramine and 1.4 grams of pure ammonium chloride (essentially the proportions in which these products would be formed in the reaction) dissolved in 25 cc. of 85% alcohol.

Mixture No. 1 was placed in a flask on the water bath and the solvent distilled off as completely as possible at 100° C. The residue was hygroscopic and gummy due to the hygroscopic character of hexamethylenetetramine hydrochloride.

Mixture No. 2 was evaporated on the water bath in the same manner with a slow stream of ammonia gas flowing through the flask. In the latter stages of drying, of course, this slow stream of ammonia formed practically a complete atmosphere of ammonia in the flask.

Both residues now were extracted with chloroform to recover all free hexamethylenetetramine.

Hexamethylenetetramine yield in No. 1, 0.058 grams=19.3%.

Hexamethylenetetramine yield in No. 2, 0.284 grams=94.6%.

It is perfectly obvious that the use of ammonia in the evaporation has preserved hexamethylenetetramine in the free form, whereas the lack of ammonia in the evaporation has resulted in the loss of more than 80% of the hexa. The term "loss" is not used in the absolute sense; most of the hexamethylenetetramine still exists in the residue in the form of its hydrochloride and may be converted into free hexamethylenetetramine by treatment with ammonia gas. Some loss by escape, however does occur, due to hydrolysis of hexamethylenetetramine in the presence of hexamethylenetetramine hydrochloride, and the evolution of free formaldehyde together with the solvent. It is necessary, therefore, to maintain an excess of ammonia at all times in the evaporation and drying in order to prevent this loss. Several methods of handling this problem of hydrolysis are applicable, but further discussion of this subject will be deferred until after the reaction velocity has been discussed.

The reaction takes place in alcoholic solutions, both aqueous alcoholic and absolute alcoholic solutions, and also in aqueous solution. The reaction proceeds with the greatest ease and most rapidly in pure aqueous solution and with increasing sluggishness as the alcoholic content increases. These facts were established by a series of five experiments, each employing five test tubes. The manipulative procedure was as follows in all experiments: Small glass tubes were prepared and hermetically sealed; each tube containing 0.170 gram of methylene chloride and 2.1 cc. of alcoholic ammonia solution. The alcoholic content varied from 25% to 100% and the ammonia content was maintained approximately constant at 35% excess ammonia over and above that required theoretically for the methylene chloride used. All tubes were heated in boiling water and their contents analyzed for chloride in order to establish the state of the reaction. The following tables show the first and fifth of these experiments, and the intermediate experiments will be commented on briefly:

Reaction velocity in absolute alcohol at a temperature of 100° C.

*Experiment 1.*

| Tube | Heated. | State of reaction. |
| --- | --- | --- |
| 1 | 1 hour | 0.5% complete. |
| 2 | 17 hours | 10.0% complete. |
| 3 | 41 hours | 23.0% complete. |
| 4 | 96 hours | 51.5% complete. |
| 5 | 151 hours | 68.0% complete. |

Reaction velocity in 25% alcohol at a temperature of 100° C.; five tubes.

*Experiment 5.*

| Tube. | Heated. | State of reaction. |
| --- | --- | --- |
| 1 | 1.5 hours | 9.0% complete. |
| 2 | 18.0 hours | 67.5% complete. |
| 3 | 30.0 hours | 85.0% complete. |
| 4 | 41.5 hours | 93.0% complete. |
| 5 | 66.5 hours | 98.9% complete. |

By experiments of an intermediate character, it was found that, employing a solvent consisting of 95% alcohol and 5% water, the results did not vary to any notable extent from the results obtained in Experiment 1.

Dealing with a solvent consisting of 85% alcohol and 15% water, the reaction was 55.0% complete at the end of 48 hours, and was 81.9% complete at the end of 96 hours.

Using 60% alcohol and 40% water, the reaction was 78.0% complete at the end of 49 hours, and was 98.4% complete at the end of 93 hours. Other tests were made, but it is unnecessary to state the results here.

The foregoing experiments were conducted in ethyl alcohol solutions. Methyl alcohol may be used with practically the same results.

*Reaction in aqueous solution.*

The hexamethylenetetramine reaction takes place readily in aqueous ammonia solution and more particularly in solutions of high ammonia concentration. These facts are clearly shown in the following series of experiments:

Five test tubes were prepared and hermetically sealed, each containing 0.170 gram of methylene chloride and 2.1 cc. of aqueous ammonia solution, of the ammonia content listed below. All tubes were heated in boiling water at the same time for a period of four hours and the state of the reaction with respect to the contents of each tube is set forth in the table:

| Tube. | Contained. | State of reaction. |
| --- | --- | --- |
| 1 | 0.091 g. NH3 (theoretical) | 22.5% complete. |
| 2 | 0.182 g. NH3 (100% excess) | 37.0% complete. |
| 3 | 0.273 g. NH3 (200% excess) | 51.0% complete. |
| 4 | 0.364 g. NH3 (300% excess) | 68.0% complete. |
| 5 | 0.455 g. NH3 (400% excess) | 75.5% complete. |

The foregoing shows that the ammonia concentration is of quite considerable importance in governing the reaction velocity. It may be added that the concentration in tube 5 is somewhat less than the concentration of ordinary commercial aqueous ammonia (27% to 28% strength).

Temperature is also a factor governing the reaction velocity. Reaction takes place in aqueous ammonia solutions even at ordinary atmospheric temperatures, but with very low reaction velocity. The reaction velocity has not been followed out fully at room temperature, but it can be stated that reaction is only 2% to 3% complete at 20° to 25° C., after 150 hours. The reaction velocity increases rapidly and becomes of practical importance at temperatures, say, ranging from 50° C. to 120° C. For example, employing aqueous ammonia solution in about 400% excess above the theoretical quantity, the reaction can be completed at a temperature of 60° in about 150 hours, can be completed at 100° C. in about 9 hours, and can be completed at 120° C. in about 3 hours. Practical considerations will govern the temperature to be employed in a working plant. A preferred range of temperature is somewhere between 80° C. and 120° C., and perhaps, for all around purposes, about 100° C. is the best temperature to employ.

The following may be given as an example of the improved method:

Introduce into an autoclave methylene chloride and an aqueous solution of ammonia, employing a concentration of ammonia which preferably is a saturated solution, or nearly so, at room temperature; take a sufficient quantity of aqueous solution of ammonia to give an excess of 300 or 400% of ammonia above the theoretical proportion as explained in the first equation given above. Heat the autoclave at a temperature in the neighborhood of 100° C. until the reaction is complete, that is, until all of the methylene chloride has reacted. Ordinarily, this will require a period of eight to ten hours. As the temperature in the autoclave rises, the pressure rises from approximately atmospheric pressure to perhaps 100 to 125 pounds, depending upon the rate of heat, for it is to be observed that while the pressure is a function of the temperature, the pressure is also affected by the consumption of the reagents during the reaction, the pressure tending to fall as a result of the reaction.

The time may be shortened greatly by increasing the temperature to 120° C. and the resultant pressure will be somewhat higher, say, a maximum in the neighborhood of 150 pounds per square inch.

The amount of methylene chloride first introduced into the autoclave may be sufficient to produce substantial saturation of the liquor with hexamethylenetetramine and ammonium chloride at the completion of the operation, and fresh ammonia may be pumped into the autoclave, from time to time, as the heating is continued, to maintain the desired excess percentage of ammonia. After the reaction has been completed, the liquor, containing the hexamethylenetetramine and ammonium chloride produced by the reaction, is withdrawn from the autoclave. The products of reaction may be separated from each other by any suitable method, care being taken to avoid conditions which might produce the phenomenon of hydrolysis. One method of procedure is to evaporate the solvent under such conditions as to maintain free ammonia in contact with the reaction products at all times. Thus, for example, the evaporation of water and ammonia may proceed, employing suitable facilities to recover the ammonia driven off; and before all of the free ammonia escapes, to introduce a stream of ammonia gas into or through the products of the reaction and maintain an ammoniacal atmosphere during the drying of the residue. After the residue has been properly dried, it may be subjected to the action of a solvent which will dissolve the hexamethylenetetramine, without dissolving the ammonium chloride. The hexamethylenetetramine may then be recovered from the solvent. Any suitable solvent, such as chloroform or carbon tetrachloride may be employed.

Another method of effecting separation is to remove the solvent under reduced temperature and pressure, that is by employing a vacuum process and removing solvent or water to a point where the reaction products remain as a gummy mass; then introducing a stream of ammonia to produce an ammoniacal atmosphere and drying either at low or elevated temperature. The drying can be carried out either under partial vacuum, or at atmospheric pressure, if the precaution be taken to maintain an ammoniacal atmosphere in contact with the products of reaction. The separation of the hexamethylenetetramine may then be effected in any suitable manner.

Where the process is to be practiced on a commercial basis, an elaboration of the process probably is desirable. The accompanying drawing illustrates, diagrammatically, apparatus, or a flow sheet of apparatus, for practicing such process, and the process will be described in connection therewith.

In the drawing, A represents a storage tank which may be regarded as containing a supply of solution of ammonia, preferably a concentrated solution, saturated with hexamethylenetetramine and ammonium chloride; B, an autoclave which communicates, through a pipe 1, with the storage tank A; C, a storage tank containing methylene chloride, and which communicates, through a pipe 2, with the autoclave; D, a cooling-tank which will serve to cause the ammonium chloride formed in the reaction to be deposited or crystallized out, and which may serve also to receive an additional supply of ammonia to cause the hexamethylenetetramine formed in the reaction to crystallize out, the cooling-tank D communicating with the autoclave, through a pipe 3, and being equipped with a cooling jacket served by water-circulating pipes 4; E, a filter or centrifuge adapted to receive the contents of the tank B, through a pipe 5, the liquor from the device E being adapted to return to the tank A, through a pipe 6; F, a drier adapted to receive the ammonium chloride and hexamethylenetetramine from the tank E, through a pipe 7; G, an extractor, or tank, adapted to receive the dried products from the drier F, through a pipe 8; H, a solvent-storage tank, which may contain chloroform, for example, said tank communicating with the extractor, through a pipe 9; I, a still which receives the solution of hexamethylenetetramine from the extractor G, through a pipe 10; J, a storage tank for hexamethylenetetramine which receives the hexamethylenetetramine from the still I, through a pipe 11; K, a drier which receives the ammonium chloride from the extractor G, through a pipe 12; L, a storage tank for the ammonium chloride; M, a storage tank for liquid ammonia from which extends a supply pipe 13, equipped with a reducing valve 14; 15, a branch pipe connecting the pipe 13 below the reducing valve with the cooling and crystallizing tank D; 16, a pipe forming an extension of the pipe 13 and connected with the drier F; and N, a condenser which receives solvent vapors from the drier F, through a pipe 17, and which, in turn, communicates, through a pipe 18, with the pipe 13 below the reducing valve 14.

The system is shown further equipped with valves 19, 20, 21, and 22.

In operating the system, a suitable supply of what may be termed the stock liquor is taken from the tank A into the autoclave B. From the tank C, the desired amount of methylene chloride is admitted to the autoclave. Preferably the amount of methylene chloride admitted is such as to constitute about 20% of the theoretical amount required to combine with the ammonia contained in the stock liquor in the autoclave. The autoclave is heated for a sufficient length of time to cause reaction of the methylene chloride therein; the liquor is then withdrawn through the cooling and crystallizing tank D and is there cooled preferably to about room temperature; ammonia is then admitted, through the pipe 15, which is controlled by a valve 15ª, and the cooling is continued to compensate for the heat of solution of the ammonia. The effect of the cooling is to crystallize out the ammonium chloride formed by the reaction in the autoclave; and the effect of introducing ammonia through the pipe 15 is to crystallize out the hexamethylenetetramine formed in the reaction and restore the stock solution content to its original percentage in the stock liquor. From the device D, the liquor containing the precipitated products of reaction passes to the filter or centrifuge E and from there the mother liquor is returned, through the pipe 6, to the stock liquor tank A. The admission of the solvent from the tank H to the extractor G is controlled by a valve 9ª. Other valves may be added to the system, if desired. It should be understood, of course, that the drawing represents a flow sheet, and where pipes have been mentioned, they may not be used in actual practice in some instances. For example, if the device E be a centrifuge, the products of reaction from which the mother liquor has been driven by centrifugal action will be removed by any suitable mechanical means from the centrifuge to the drier F.

It will be noted, in considering the foregoing method that ammonia passes through the pipe 16 to the drier F, while the remaining amount of solvent is being evaporated from the reaction products. This precaution is taken notwithstanding the fact that the mother liquor contains a large excess percentage of ammonia, the purpose being to constantly supply ammonia to replace that which is driven off in the drying operation.

The crystallizing of the hexamethylenetetramine by the introduction of ammonia into the crystallizer D depends upon the phenomenon that an increase in ammonia content of the liquor decreases the ability of the liquor to serve as a solvent for the hexamethylenetetramine. On the other hand, the hexamethylenetetramine goes into, or is formed in solution, in the autoclave B, due to a reduction in the ammonia content resulting from the reaction, it being borne in mind that at the start the liquor being heated in the autoclave is saturated with hexamethylenetetramine. Again, an increase in ammonia content in the stock liquor increases to a certain extent the ability of the liquor to dissolve ammonium chloride. This last phenomenon is of no particular consequence in the method carried out as here described, however.

From explanations given above, it will be understood that the reaction may be effected in the autoclave, regardless of whether an excess of ammonia is employed or not, provided there is sufficient ammonia present in the autoclave at all times to correspond with the theoretical proportion. Practically speaking, this means that some excess of ammonia must be present in order that no phenomenon of hydrolysis may occur. The effect of the use of a large excess of ammonia in the autoclave is to greatly expedite the reaction. On the other hand, when the drying is effected in the processes here described, it is essential to maintain an ammoniacal atmosphere while the drying is being done.

The improved process provides for producing hexamethylenetetramine directly from methylene chloride and ammonia in a simple and economical manner, and possesses important advantages over known methods.

Any suitable source of supply for ammonia may be used. Preferably the source of supply is a tank of liquid ammonia.

It will be understood that by employing in the system a stock liquor saturated with hexamethylenetetramine and ammonium chloride, it is possible to crystallize out the hexamethylenetetramine and ammonium chloride which are formed in the reaction and avoid evaporation of the solvent, except for the traces which remain after the centrifuge operation. While, for the purpose of illustration, the tank A has been assumed to be provided with a stock liquor enabling the operation to be started on the right basis from the outset, nevertheless, it is understood that it is quite possible to build up the liquor to a point where it is saturated with hexamethylenetetramine and ammonium chloride by supplying requisite quantities of methylene chloride and gaseous ammonia until the point of saturation is reached, that is, avoiding the emptying of the autoclave until the liquor has been built up to this strength. The system may then be operated in the manner explained.

From the explanation given above, it follows that in operating the process advantageously, rather a wide latitude is allowable in the proportion of the methylene chloride employed with respect to the ammonium employed in the reacting mixture. Thus, operating the system employing the aqueous solution saturated with hexamethylenetetramine and ammonium chloride, the proportion of methylene chloride employed may vary through a range of from 20% to 50% of the theoretical amount required to combine with the ammonia present in the reacting mixture, and still the operation may be carried out within a reasonable period of time.

The foregoing detailed description has been given for clearness of understanding only, and no unnecessary limitations should be understood therefrom, but the appended claims should be construed as broadly as permissible in view of the prior art and in view of the premises.

What I regard as new and desire to secure by Letters Patent is:

1. The process of producing hexamethylenetetramine which comprises: reacting upon methylene chloride with ammonia present as a constituent of a solvent composed largely of water.

2. The process of producing hexamethylenetetramine which comprises: reacting upon methylene chloride with ammonia present as a constituent of a solvent composed largely of water, the ammonia being present in excess of the theoretical proportion.

3. The process of producing hexamethylenetetramine which comprises: reacting upon methylene chloride with ammonia present as a constituent of a solvent composed largely of water, the ammonia being present in proportion corresponding with more than one hundred per cent excess above the theoretical proportion.

4. The process of producing hexamethylenetetramine which comprises: reacting upon methylene chloride with ammonia present as a constituent of a solvent containing water, and effecting drying while maintaining in contact with ammoniacal atmosphere said reaction products.

5. The process of producing hexamethylenetetramine which comprises: reacting upon methylene chloride with ammonia present as a constituent of a solvent composed largely of water, the reacting mixture being heated to a temperature above 50° C.

6. The process of producing hexamethylenetetramine which comprises: reacting upon methylene chloride with ammonia present as a constituent of a solvent composed largely of water, the ammonia being present in a proportion corresponding with an excess of more than one hundred per cent above the theoretical proportion and the reacting mixture being heated to a temperature above 50° C.

7. The process of producing hexamethylenetetramine which comprises: reacting upon methylene chloride with ammonia in a liquor comprising aqueous ammonia substantially saturated with hexamethylenetetramine and ammonium chloride, the proportion of methylene chloride employed in the reaction being less than the theoretical proportion required to react with the ammonia present in the reacting mixture.

8. The process of producing hexamethylenetetramine which comprises: reacting upon methylene chloride with ammonia in a liquor comprising aqueous ammonia substantially saturated with hexamethylenetetramine and ammonium chloride, the proportion of methylene chloride employed in the reaction being less than the theoretical proportion required to react with the ammonia present in the reacting mixture, the reacting mixture being subjected to a temperature above 50° C.

9. The process of producing hexamethylenetetramine which comprises: reacting upon methylene chloride with ammonia in a liquor comprising aqueous ammonia substantially saturated with hexamethylenetetramine and ammonium chloride, the proportion of methylene chloride employed in the reaction being less than the theoretical proportion required to react with the ammonia present in the reacting mixture, the reacting mixture being subjected to a temperature above 50° C., and then effecting separation from the liquor of the products produced by the reaction.

10. The process of producing hexamethylenetetramine which comprises: reacting upon methylene chloride with ammonia in a liquor comprising aqueous ammonia substantially saturated with ammonium chloride and hexamethylenetetramine, the methylene chloride being present in the reacting mixture in a proportion corresponding with substantially less than the theoretical proportion and the reacting mixture being subjected to a temperature exceeding 50° C., cooling the liquor after completion of the reaction to precipitate the ammonium chloride formed in the reaction, and introducing ammonia into the liquor to precipitate the hexamethylenetetramine formed in the reaction.

11. The process of producing hexamethylenetetramine which comprises: reacting upon methylene chloride with ammonia in a liquor comprising aqueous ammonia substantially saturated with ammonium chloride and hexamethylenetetramine, the methylene chloride being used in a proportion corresponding with from 20% to 50% of the theoretical amount required to combine with all the ammonia present in the reacting mixture.

12. The process of producing hexamethylenetetramine which comprises reacting upon methylene chloride with ammonia present as a constituent of a solvent composed largely of water, separating the products of reaction from the bulk of the solvent, and effecting drying of the products of reaction while maintaining the same in contact with an ammoniacal atmosphere.

13. The process of producing hexamethylenetetramine which comprises: reacting upon methylene chloride with ammonia present as a constituent of a solvent composed largely of water, separating the products of reaction from the bulk of the solvent, and separating the hexamethylenetetramine formed in the reaction from the ammonium chloride formed in the reaction.

14. The process of producing hexamethylenetetramine which comprises: reacting upon methylene chloride with ammonia in a liquor comprising aqueous ammonia substantially saturated with hexamethylenetetramine and ammonium chloride, the proportion of methylene chloride employed in the reaction being less than the theoretical proportion required to react with the ammonia present in the reacting mixture, crystallizing out from the liquor products formed in the reaction, drying the products of reaction in an ammoniacal atmosphere, and separating the products of the reaction from each other.

15. The process of producing hexamethylenetetramine which comprises: reacting upon methylene chloride with ammonia present as a constituent of a solvent composed largely of water, the ammonia being present in a proportion exceeding the theoretical proportion and the reaction mixture being heated to a temperature above 50° C. while being maintained under pressure, separating the reaction products from the liquor, and drying the reaction products in an ammoniacal atmosphere.

16. The process of producing hexamethylenetetramine which comprises: reacting upon methylene chloride with ammonia in a solvent comprising aqueous ammonia substantially saturated with hexamethylenetetramine and ammonium chloride, the proportion of methylene chloride being less than the theoretical proportion required to react with the ammonia present in the reacting mixture, the reacting mixture being subjected to a temperature exceeding 50° C., while being maintained under pressure, cooling the liquor after completion of the reaction to crystallize out the ammonium chloride formed, introducing ammonia into the liquor to substantially restore the proportion of ammonia and crystallize out the hexamethylenetetramine formed in the reaction, separating the bulk of the liquor from the products of reaction, drying the products in an ammoniacal atmosphere, and extracting the hexamethylenetetramine from the ammonium chloride formed in the reaction.

CARNIE B. CARTER.